(12) United States Patent
Dinh et al.

(10) Patent No.: US 7,418,149 B2
(45) Date of Patent: Aug. 26, 2008

(54) APPARATUS AND METHOD FOR ADAPTIVE 3D NOISE REDUCTION

(75) Inventors: Chon Tam Le Dinh, Montreal (CA); Duong Tuan Nguyen, Montreal (CA); Thi Thanh Hien Nguyen, Hue (VN)

(73) Assignee: Algolith Inc., Montreal, Quebec (CA)

( * ) Notice: Subject to any disclaimer, the term of this patent is extended or adjusted under 35 U.S.C. 154(b) by 383 days.

(21) Appl. No.: 11/191,919

(22) Filed: Jul. 29, 2005

(65) Prior Publication Data

US 2006/0056724 A1    Mar. 16, 2006

Related U.S. Application Data

(60) Provisional application No. 60/592,339, filed on Jul. 30, 2004.

(51) Int. Cl.
*G06K 9/40* (2006.01)
*H04N 5/21* (2006.01)

(52) U.S. Cl. ............... 382/254; 382/274; 348/607; 348/701

(58) Field of Classification Search ............ 348/701, 348/607; 382/274
See application file for complete search history.

(56) References Cited

U.S. PATENT DOCUMENTS

| | | | | |
|---|---|---|---|---|
| 4,163,258 | A * | 7/1979 | Ebihara et al. | 348/618 |
| 4,503,461 | A * | 3/1985 | Nishimura | 378/98.12 |
| 4,523,230 | A | 6/1985 | Carlson et al. | |
| 4,573,070 | A | 2/1986 | Cooper | |
| 5,161,018 | A * | 11/1992 | Matsunaga | 348/620 |
| 5,191,419 | A * | 3/1993 | Wischermann | 348/701 |
| 5,260,775 | A | 11/1993 | Farouda | |
| 5,404,179 | A * | 4/1995 | Hamasaki | 348/620 |
| 5,442,407 | A | 8/1995 | Iu | |
| 5,499,057 | A * | 3/1996 | Kondo et al. | 348/607 |
| 5,936,676 | A * | 8/1999 | Ledinh et al. | 348/452 |
| 6,061,100 | A | 5/2000 | Ward et al. | |
| 6,067,125 | A | 5/2000 | May | |
| 6,281,942 | B1 | 8/2001 | Wang | |
| 6,633,683 | B1 * | 10/2003 | Dinh et al. | 382/260 |
| 6,819,804 | B2 * | 11/2004 | Tenze et al. | 382/262 |

(Continued)

OTHER PUBLICATIONS

International Search Report Form PCT/ISA/210 pp. 1-3.

(Continued)

*Primary Examiner*—Samir A. Ahmed
*Assistant Examiner*—Stephen R Koziol
(74) *Attorney, Agent, or Firm*—Fasken Martineau DuMoulin; Alexandre Abecassis (57) ABSTRACT

A non-iterative 3D processing method and system is disclosed for generic noise reduction. The 3D noise reducer is based on a simple conversion of the five types of noise to equivalent additive noise of varying statistics. The proposed technique comprises also an efficient temporal filtering technique which combines Minimization of Output Noise Variance (MNV) and Embedded Motion Estimation (EME). The proposed temporal filtering technique may be furthermore combined with classical motion estimation and motion compensation for more efficient noise reducer. The proposed technique comprises also a spatial noise reducer which combines Minimum Mean Squared Error (MMSE) with robust and effective shape adaptive windowing (SAW) is utilized for smoothing random noise in the whole image, particularly for edge regions. Another modification to MMSE is also introduced for handling banding effect for eventual excessive filtering in slowly varying regions.

14 Claims, 6 Drawing Sheets

U.S. PATENT DOCUMENTS

| | | | |
|---|---|---|---|
| 6,856,699 B1* | 2/2005 | Olivieri | 382/232 |
| 7,034,892 B2* | 4/2006 | Ojo et al. | 348/607 |
| 7,076,113 B2* | 7/2006 | Le Dinh | 382/261 |
| 2001/0019633 A1 | 9/2001 | Tenze et al. | |

OTHER PUBLICATIONS

A.R. Weeks Jr., "Fundamentals of Electronic Image Processing", SPIE Optical Engineering Press, Bellingham, Washington, 1996 or I. Pitas, pp. 173-227.

A.N. Venetsapoulos, "Nonlinear Digital Filters: Principles and Applications", Kluwer Academic Publishers, Boston, 1990, pp. 267-311.

J.S. Lee in "Digital image enhancement and noise filtering by use of local statistics", IEEE Trans. on PAMI-2, Mar. 1980, pp. 165-168.

Y. Yu and S.T. Acton in "Speckle Reducing Anisotropic Diffusion", IEEE Trans. on Image Processing, vol. 11, Nov. 2002, pp. 1260-1270.

P. Chan and J.S. Lim, "One dimensional processing for adaptive image restoration", IEEE Trans. on ASSP-33, Feb. 1985, pp. 117-126.

J.S. Lee, "Digital Image smoothing and the Sigma filter", Computer Vision, Graphics, and Image Processing-24, 1983, pp. 255-269.

G. Wischerman, "The Digital Wetgate: A Third-Generation Noise Reducer", SMPTE Journal, Feb. 1996, pp. 95-100.

Kim and Woods, "Spatio-temporal adaptive 3-D Kalman filter for Video", IEEE Transactions on Image Processing, vol. 6, No. 3, Mar. 1997.

Katsaggelos and al. in "Adaptive Image Sequence Noise Filtering Methods", SPIE vol. 1606 Visual Communication and Image Processing 1991, pp. 716-727.

K. Ozkan et al. in "Adaptive Motion Compensated Filtering of Noisy Image Sequences", IEEE Trans. on Circuit and Systems for Video Technology, vol. 3, No. 4, Aug. 1993, pp. 277-290.

Boo and Bose "A motion-compensated spatio-temporal filter for image sequences with signal dependent noise", IEEE Trans. on Circuit and Systems for Video Technology, vol. 8, No. 3, Jun. 1998, pp. 287-298.

* cited by examiner

Figure 1 – Multiple noise Type Noise Reducer (MTNR) Block Diagram

Figure 2 – Noise Power Converter for five given types of noise

Figure 3 – EME Temporal Recursive Filter

Figure 4 – EME Temporal Recursive Filter with classical motion

Figure 5 – Embedded Motion Estimation & Temporal Filter Coefficient Calculator

Figure 6 – SAW Spatial Noise Reducer

Figure 7 – Adaptive Gain K Calculator

Figure 8– Segmentation adaptive Facet based MSE Spatial Noise Reducer

Figure 9 – Multiple noise Type Spatial Noise Reducer (MT-SNR)

APPARATUS AND METHOD FOR ADAPTIVE 3D NOISE REDUCTION

CROSS-REFERENCE TO RELATED APPLICATIONS

This application claims priority under 35USC§119(e) of U.S. provisional patent application 60/592,339, entitled "Apparatus and method for adaptive 3D artifact reducing for encoded image signal" and filed Jul. 30, 2004, the specification of which is hereby incorporated by reference.

TECHNICAL FIELD

The invention relates to image 3D noise reduction techniques primarily operable in real-time in an image or a sequence of images. More particularly, the invention relates to adaptive spatio-temporal filtering techniques suitable for many type of noise in image applications.

BACKGROUND OF THE INVENTION

The existing literature and/or patents on noise reducing techniques are abundant. Image de-noising techniques may be classified as spatial or temporal ones or a combination of them. Spatial techniques relate generally to some coring techniques applied to high frequency part of a considered image. Temporal de-noising techniques relate to temporal coring techniques applied mainly in detected or estimated still parts of a picture. Image de-noising techniques may be classified as spatial or temporal ones. A series combination of the spatial and temporal techniques, easier to do than a true 3D processing, is possible and may be of advantage. In the following, the general trend of the subject will be reviewed and the specific spatial or temporal exiting noise reducers will be considered in some details.

The spatial noise reducing techniques may be applied to either still pictures or to a sequence of images. In general, the spatial noise reducing techniques may be divided further into three categories.

In the first category, the spatial nonlinear filters are based on local order statistics. These techniques may be found, for example, in A. R. Weeks Jr., "Fundamentals of Electronic Image Processing", SPIE Optical Engineering Press, Bellingham, Wash., 1996 or I. Pitas, and A. N. Venetsapoulos, "Nonlinear Digital Filters: Principles and Applications", Kluwer Academic Publishers, Boston, 1990. Using a local window around a considered pixel, these filters are working on this set of pixels ordered now from their minimum to their maximum values. The median filter, the min/max filter, the alpha-trimmed mean filter, and their respective variants may be classified in this category. These filters work well for removing impulse like salt-and-pepper noise. For the small amplitude noise these filters can blur some details or small edges.

In the second category, the coring techniques are applied in another domain different from the original image spatial domain. The chosen domain depends partly on the noise nature. The U.S. Pat. No. 4,163,258 uses the Walsh-Hadamard transform domain; meanwhile, the U.S. Pat. No. 4,523,230 suggests some sub-band decomposition. Finally, the homomorphism filter, working in logarithmic domain, is the classical one for removing multiplicative noise and image shading from an image.

In the third category, the filters are locally adaptive and the noise removing capacity is varying from homogenous regions to edge regions.

The well-known filter in this category is the minimum mean square error (MMSE) filter proposed originally by J. S. Lee in "Digital image enhancement and noise filtering by use of local statistics", IEEE Trans. on PAMI-2, March 1980, pp. 165-168. The filtered pixel output is additively composed of local mean value and a pondered difference of the noisy pixel and the local mean intensity values. The optimum weight, which corresponds to a kind of coring technique, may be determined for additive noise by the local variance ratio of the true clean image and the noisy one. The minimum mean square error filter removes noise well for homogenous regions and reserves the image edges. However, the noise essentially remains in edge or near edge regions. Moreover, the optimum weight is changing for other types of noise.

A relationship of Lee's filter and recent Anisotropic Diffusion techniques may be shown by Y. Yu and S. T. Acton in "Speckle Reducing Anisotropic Diffusion", IEEE Trans. on Image Processing, vol. 11, November 2002, pp. 1260-1270.

In P. Chan and J. S. Lim, "One dimensional processing for adaptive image restoration", IEEE Trans. on ASSP-33, February 1985, pp. 117-126, there is presented a method for noise reducing in edge regions. The authors have proposed the use, in series, of four (4) one-dimensional minimum mean square error filters respectively along 0°, 45°, 90° and 135° directions. The obtained results are impressive for large variance noise. For small noise, the filter can blur however some image edges. Moreover, the noise variance output at each filter stage is to be costly estimated.

For the same purpose, in J. S. Lee, "Digital image smoothing and the Sigma filter", Computer Vision, Graphics, and Image Processing-24, 1983, pp. 255-269, the author has proposed a Sigma filter. For noise removing, the filter calculates, in a local window of 5×5 dimensions, the mean value of similar pixel intensities to that of the central considered pixel. For small noise, the Sigma filter works well, except small image details and some pixels with sharp spot noise. For the latter, J. S. Lee has suggested also, in a heuristic manner, the use of immediate neighbor average at the expense of some eventually blurred picture edges.

U.S. Pat. No. 4,573,070 discloses a Sigma filter for a 3×3 window. The author has combined, in a single configuration, the Sigma filter, an order statistic filter and a strong impulse noise reduction filter.

In U.S. Pat. No. 6,633,683, a Shape adaptive Windowing combined both minimum mean square error and Sigma Filter techniques, is disclosed. However, introduced banding artifact effect in slowly varying regions and generic minimum mean square error structure for some usual types of noise are not considered.

The temporal filter is generally applied for a sequence of images in which the noise component is supposed to be non-correlated between two or many successive images. The temporal filtering techniques are based essentially on motion detection (MD) or motion compensation (MC). The filter structure may be IIR (infinite impulse response) or FIR (finite impulse response) filter with frame delay elements. In general, the temporal techniques perform better than spatial ones. The system cost is due essentially to the frame memory and the motion estimation. The temporal de-noising techniques may be found, for example, in U.S. Pat. Nos. 5,161,018, 5,191,419, 5,260,775, 5,404,179, 5,442,407, 6,061,100 and in G. Wischerman, "The Digital Wetgate: A Third-Generation Noise Reducer", SMPTE Journal, February 1996, pp. 95-100.

From a theoretical standpoint, a class of these noise filtering techniques based on well established M C Kalman filtering is proposed for spatio-temporal domain in Kim and Woods, "Spatio-temporal adaptive 3-D Kalman filter for Video", IEEE Transactions on Image Processing, Vol. 6, No. 3, March 1997. However, 3D Kalman filter is not convenient for high speed implementation or abrupt scene change. Katsaggelos and al. in "Adaptive Image Sequence Noise Filtering Methods", SPIE Vol. 1606 Visual Communication and Image Processing 1991, pp 716-727, have proposed two approaches for non stationary filtering of image sequences: a separable adaptive recursive motion compensated filter composed of three coupled 1-D estimators and a temporal non-linear filtering approach without motion estimation. M. K. Ozkan et al. in "Adaptive Motion Compensated Filtering of Noisy Image Sequences", IEEE Trans. on Circuit and Systems for Video Technology, Vol. 3, No. 4, Aug. 1993, pp 277-290 have suggested the use of adaptive weighted averaging filter for claiming to overcome presence of edge, inaccurate motion estimation and scene change. Boo and Bose in "A motion-compensated spatio-temporal filter for image sequences with signal dependent noise", IEEE Trans. on Circuit and Systems for Video Technology, Vol. 8, No. 3, June 1998, pp 287-298 have proposed a MC spatio-temporal filter using groups of frame and LMMSE in a transform domain.

The most interesting for the present invention is the second approach of Katsaggelos and al.: a temporal non-linear filtering approach without explicit motion detection or estimation. However, their approach is costly in implying five frame memories and an inversion of matrix.

U.S. Patent Application No. 2001/0019633 discloses using a kurtosis of the noise as a metric for estimating the type of noise and applied either median filter or spatio-temporal filter in function of noise discrimination.

SUMMARY OF THE INVENTION

The present invention provides an apparatus and method for efficiently reducing noise in image signal.

According to an aspect of the present invention, there is provided an apparatus and method for reducing at least five (5) types of noise. The five types of considered noise are: a)—additive noise, b)—multiplicative noise with photographic density gamma $\gamma$ negative, c)—multiplicative noise with photographic density gamma $\gamma$ positive, d)—speckle or combined noise of additive and multiplicative ($\gamma<0$) and e)—speckle or combined noise of additive and multiplicative ($\gamma>0$) The apparatus and method comprises a noise power converter to convert said five various noise types into an equivalent, signal dependent, additive noise. When dealing with an unknown noise type, the additive noise mode should be selected.

According to a further aspect of the present invention, there is provided an apparatus and method for recursively temporal filtering. In particular, the temporal filtering introduces the criterion of minimization of output noise variance (MNV) and the technique of embedded motion estimation (EME). The former performs a noise reducing suitable for high speed implementation. The latter provides efficient technique for overcoming presence of edge, inaccurate motion estimation and scene change.

According to a further aspect of the present invention, there is provided an apparatus and method for recursively temporal filtering which is complementary with classical motion estimation and compensation.

From another broad aspect of the present invention, there is provided an apparatus and method for spatial filtering which introduces shape adaptive windowing (SAW) for efficient use of minimum mean square error technique in real life. Shape adaptive windowing is a robust again noise local classification of pixels in a window into two classes homogeneous or not in respect to a considered pixel.

According to a further aspect of the present invention, there is provided an apparatus and method for spatial noise reduction which can handle introduced banding effect artifact for eventual excessive filtering in slowly varying image regions.

From another broad aspect of the present invention, there is also provided an adaptive apparatus and method for noise reduction whenever local noise power is known.

From another broad aspect of the present invention, there is also provided an adaptive apparatus and method for noise reduction for the three video components: luminance and two chrominance components.

The present description discloses an apparatus for reducing multiple noise types in a video input signal, the apparatus comprising: a noise power converter for receiving and using the video input signal, a variance of additive noise, a variance of multiplicative noise and an indication of a type of noise for estimating an equivalent additive noise variance signal; a temporal recursive filter using the equivalent additive noise variance and the video input signal for generating a temporally filtered video signal and a residual noise variance signal; and a spatial noise reducer using the residual noise variance signal and the temporally filtered video signal for spatially filtering the video input signal to provide a video output signal having reduced noise.

The present description discloses a method for reducing multiple noise types in a video input signal, the method comprising: estimating an equivalent additive noise variance signal using the video input signal, a variance of additive noise, a variance of multiplicative noise and an indication of a type of noise; temporally filtering the video input signal video signal; generating a residual noise variance signal using the equivalent additive noise variance and the video input signal; and spatially filtering the temporally filtered video signal using the residual noise variance signal and the video input signal to provide a video output signal having reduced noise.

The present description discloses an apparatus for reducing multiple noise types in a video input signal, the apparatus comprising: a noise power converter for receiving and using the video input signal, a variance of additive noise, a variance of multiplicative noise and an indication of a type of noise for estimating an equivalent additive noise variance signal; a spatial noise reducer using the equivalent additive noise variance signal and the video input signal for spatially filtering the video input signal to provide a video output signal having reduced noise.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
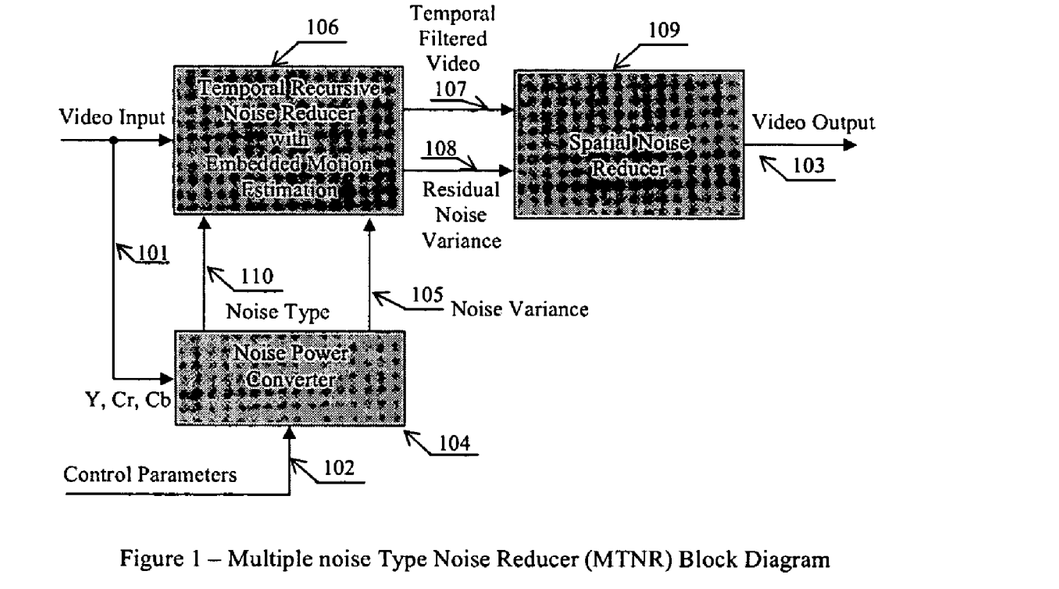
FIG. 1 is a block diagram of a preferred embodiment of a multiple noise type noise reduction (MTNR) apparatus.

Now referring FIG. 1, there is shown an embodiment of a multiple noise type noise reducing (MTNR) apparatus.

The multiple noise type noise reducing (MTNR) apparatus and method start with two main system input information types. The first video input information 101 is an image video signal composed of luminance Y and chrominance Cr, Cb components. Persons of ordinary skill in the art will understand that, except where indicated differently, such system components may be implemented in a time sharing manner or in parallel as it is well known in the art. The second information corresponds to control parameters which are applied at input 102.

The control parameters signal at input 102 represent, for five considered types of noise, three additional types of information namely: noise type (number), variance of additive noise and variance of multiplicative noise. In the disclosed embodiment, this information is specified by an end-user in a heuristic manner.

The multiple noise type noise reducing (MTNR) apparatus comprises a noise power converter (NPC) 104, an embedded motion estimation temporal recursive filter (EME-TRF) 106 and a shape adaptive windowing spatial noise reducer (SAW-SNR) 109.

The noise power converter (NPC) 104, described in detail below with reference to FIG. 2, receives the video input signal 101 and the control parameters signal 102 and estimates equivalent additive noise local power for each one of considered noise. The estimated local noise power (variance) 105 and the Noise Type number 110 are provided to the embedded motion estimation temporal recursive filter 106.

Figure 3:
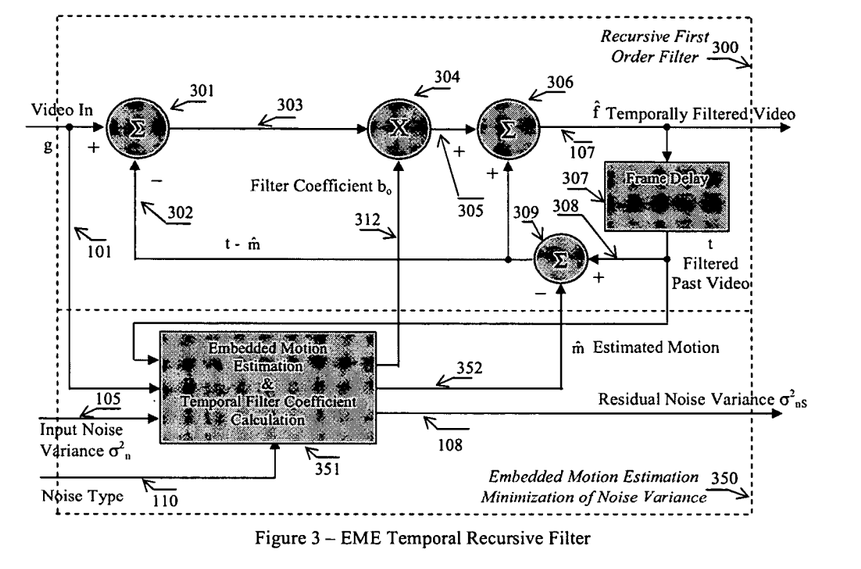
FIG. 3 is a block diagram of an embodiment of an embedded motion estimation temporal recursive filter.
Figure 4:
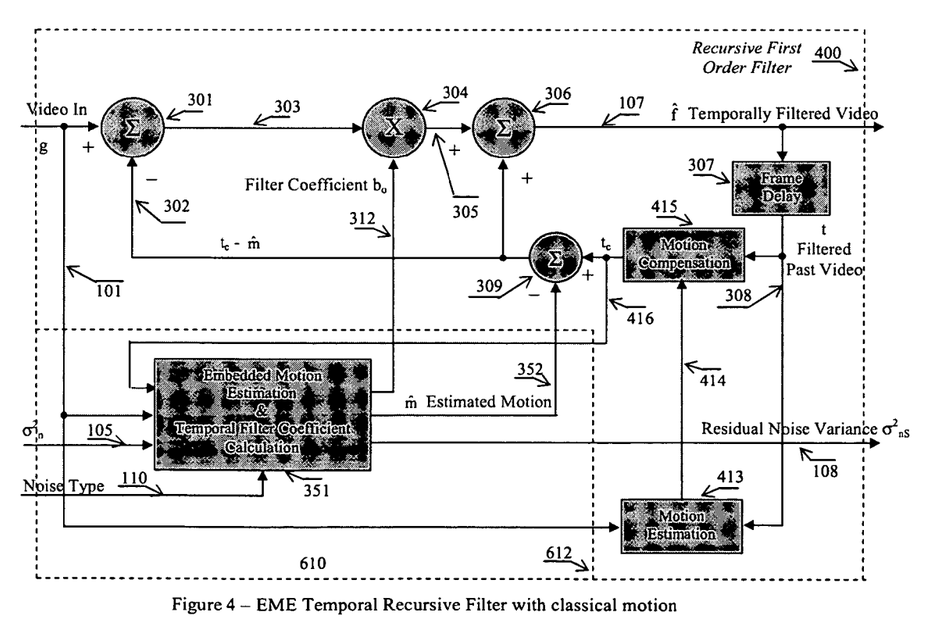
FIG. 4 is a block diagram of an embodiment of an embedded motion estimation temporal recursive filter with classical motion compensation.

The embedded motion estimation temporal recursive filter (EME-TRF) 106 receives the video input signal 101 and the local noise power signal 105 to generate at its outputs 107 and 108 corresponding respectively to a temporally filtered video signal and a residual noise variance signal. The temporally filtered video signal and the residual noise variance signal are provided in turn to the spatial noise reducer 109. Temporal recursive filter techniques described in detail below with reference to FIGS. 3 and 4 are based on Embedded Motion Estimation (EME) and Minimization of residual Noise Variance (MNV).

The spatial noise reducer 109 described in details below with reference to FIG. 8 receives the temporally filtered image signal 107 and the corresponding residual noise variance signal 108 to perform a minimum mean squared error filtering for spatial noise reduction with reduced banding effect. The final resulting image (video output) is denoted by 103.

It is worthwhile to mention that the temporal and spatial noise filtering technique is based essentially on the knowledge of local noise variance which can be either fixed or spatio-temporally varying.

Figure 2:
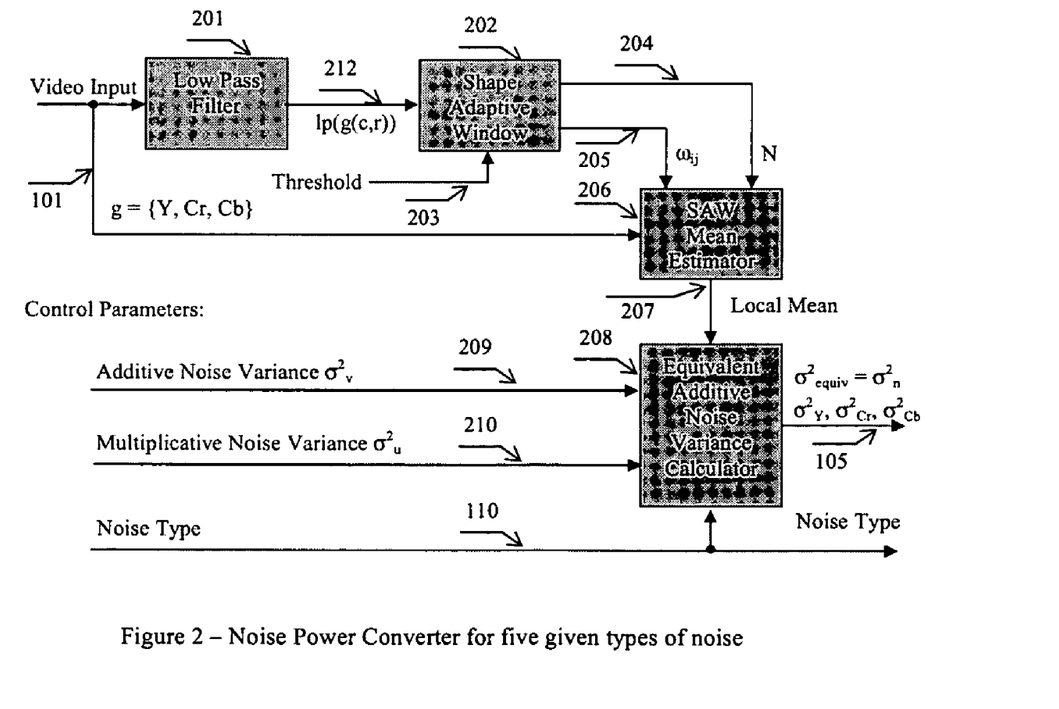
FIG. 2 is block diagram of an embodiment of a noise power conversion of five given types of noise in accordance with the invention.

Now referring to FIG. 2, there is illustrated in block diagram a noise power converter for five considered types of noise in accordance with one embodiment of the invention.

The noise power converter (NPC) 104 receives the video input signal 101 and the control parameters signal 102 and estimates the equivalent zero mean additive noise local power for each of the five types of considered noise.

The five considered types of noise are additive (referred to also as N1), multiplicative with negative gamma γ photographic density (referred to also as N2), multiplicative with positive γ (referred to also as N3), speckle with γ negative (referred to also as N4) and speckle with γ positive (referred to also as N5).

The signal models and the proposed equivalent additive noise models of the five types of noise are summarized in table 1, in which:

f is the original image of local mean μ;

g is a noisy image;

u is a multiplicative noise of unitary mean and of $\sigma^2_u$ variance;

v is an additive noise of zero mean and of $\sigma^2_v$ variance;

and A is the amplitude signal value; (i.e. for an 8-bit representation, a possible value of A is 256).

It is assumed that the multiplicative noise u and the additive v noise are statistically independent. $\sigma^2_n$ is the variance of the equivalent additive noise.

TABLE 1

Noise Models and Equivalent Additive Noise Variance

| Type | Signal Model | Equivalent Signal Model | Estimated Equivalent Additive Noise $\sigma^2_n$ |
|---|---|---|---|
| N1: Additive Noise | g = f + v | g = f + v | $\sigma^2_v$ |
| N2: Multiplicative Noise (γ < 0) | g = f · u | g = f · u | $\mu^2 \cdot \sigma^2_u$ |
| N3: Multiplicative Noise (γ > 0) | A − g = (A − f) · u | g = A · (1 − u) + f · u | $(A − \mu)^2 \cdot \sigma^2_u$ |
| N4: Combined or Speckle Noise (γ < 0) | g = f · u + v | g = f · u + v | $\mu^2 \sigma^2_u + \sigma^2_v$ |
| N5: Combined or Speckle Noise (γ > 0) | A − g = (A − f) · u + v | g = A · (1 − u) + f · u − v | $\sigma^2_u + \sigma^2_v$ |

For example, in the N2 case, if g=f·u and g=f+n, where n is the equivalent additive noise then n=f·(u−1). Hence the true equivalent additive noise variance is $\sigma^2_n = (\mu^2 + \sigma^2_f) \cdot \sigma^2_u$. However, for simplicity purpose and for direct optimization minimum mean square error compatibility the term $\sigma^2_f$ will be neglected and $\sigma^2_n = \mu^2 \cdot \sigma^2_u$. Of course, μ is unknown and should be estimated with some accuracy.

In the N4 case, if g=f·u+v and g=f+n, where n is the equivalent additive noise then n=f·(u−1)+v. Hence $\sigma^2_n = \mu^2 \sigma^2_u + \sigma^2_v$.

The last column in previous table shows that the signal mean value μ is required for equivalent additive noise calculation. However, the signal mean value μ is unknown and must be estimated. The proposed estimation can be done by a robust sliding Shape Adaptive Window as illustrated by FIG. 2.

The noisy luminance component Y is considered in the video input signal 101 provided to low pass filter 201 and to mean estimator 206. The low pass filter 201 is required for providing some robustness against noise. Its proposed impulse response is given as follows:

$$lp201(c, r) = \begin{bmatrix} 7 & 7 & 7 \\ 7 & 8 & 7 \\ 7 & 7 & 7 \end{bmatrix} / 64$$

It is a modified version without multiplier of the well-known box car filter. (c,r) denotes the current pixel coordinates.

The output of the low pass filter 201 is applied now to a sliding local shape adaptive window (SAW) 202. The shape adaptive window (SAW) 202 classifies, in turn, pixels in the window centered at the coordinates (c,r) into two categories: similar ("1") or not ("0") with the pixel of interest (c,r).

The following notation is defined:

$$Y_{ij}(c,r) = Y(c+i, r+j). \tag{1}$$

The shape adaptive window 202 provides at its respective outputs 204 and 205 the following signals:

$$\omega_{ij}(c, r) = \begin{cases} 1, & \text{if } |lp(Y_{ij}(c, r)) - lp(Y_{00}(c, r))| < \text{Threshold} \\ 0, & \text{else} \end{cases} \tag{2}$$

and, $$N(c, r) = \sum \sum \omega_{ij}(c, r). \tag{3}$$

In which $lp(Y(c,r))$ is the low pass filter 201 output for luminance component Y at (c,r), $\omega_{ij}(c,r)$ is a binary signal representing local classification results within a threshold tolerance 203 and $N(c,r)$ is local similar pixels number in the window.

Equation (2) describes the robust local classification of the proposed shape adaptive window. One more time again, the low pass filter 201 is important for providing robustness against noise in image classification.

The shape adaptive window outputs 204 and 205 and the noisy luminance input signal 101 are applied together to shape adaptive window mean estimator 206 to provide a local estimated mean signal value $\mu_Y(c,r)$ output 207. The shape adaptive window mean estimator 206 performs the following calculation:

$$\mu_Y(c, r) = (1/N(c, r)) \sum_i \sum_j Y_{ij}(c, r) \omega_{ij}(c, r) \tag{4}$$

The local estimated mean signal value $\mu_Y(c,r)$ output 207, the additive noise variance $\sigma^2_v$ 209, the multiplicative noise variance $\sigma^2_u$ 210, and the noise type signal 110 are applied together to equivalent additive noise variance calculator (EANVC) 208. In accordance with the last column in the previous table, the equivalent additive noise variance calculator 208 provides the variance $\sigma^2_n$ signal 105 for the present consideration of luminance component, i.e. $\sigma^2_n = \sigma^2_Y$. By default, noise will be considered by user as additive when noise type is unknown. For skilled people in the art, there are many possibilities, not shown in the Figures, for hardware or software implementation of the required calculation.

Independent but similar calculations need to be carried out for each of the chrominance components Cr and Cb. However, for possible simplification, some consideration on segmentation results $\omega_{ij}(c,r)$ from luminance component may be foreseen. In fact, for 4:4:4 sampling pattern, the same results $\omega_{ij}(c,r)$ for luminance may be used even for both Cr and Cb. For 4:2:2 sampling pattern, luminance classification results $\omega_{ij}(c,r)$ may be luminance co-sited sampled and hold, not shown, for both Cr and Cb before to apply to the shape adaptive window mean estimator 206. In 4:4:4 R, G, B sampling pattern, local classification $\omega_{ij}(c,r)$ are obtained independently for each component.

For each video component, the equivalent additive noise variance calculator 208 yields corresponding variance results 105. That are $\sigma^2_n = \sigma^2_Y$, $\sigma^2_n = \sigma^2_{Cr}$ and $\sigma^2_n = \sigma^2_{Cb}$ respectively for luminance, chrominance Cr and chrominance Cb.

For another broad aspect, when the noise type is different from the five cited cases and when equivalent additive noise variance calculation is possible, the equivalent additive noise variance calculator 208 shall be modified but shape adaptive window mean or variance estimation principle will remain.

Now referring to FIG. 3, there is illustrated an embodiment of an embedded motion estimation temporal recursive filter (EME-TRF).

The embedded motion estimation temporal recursive filter may be decomposed into two parts 300 and 350. The first part 300 comprises a simple temporal recursive first order filter receiving the noisy video input signal g 101 to provide f a temporally filtered video signal 107. Following the signal direction, it can be seen that the adder 301, multiplier 304, adder 306, frame delay 307 and subtraction operator 309 constitute the temporal recursive filter governed by the following:

$$f = (g - (t - \hat{m})) \cdot b_0 + (t - \hat{m}) \tag{5}$$

in which b0 is filter coefficient signal 312, t is the frame delay version signal 308 of the filtered image f, $\hat{m}$ is an estimated motion signal 352 and $(t - \hat{m})$ is the filter signal feedback 302. The filter signal feedback 302 may be interpreted later as motion-compensated previous filtered image.

The second part 350 of the embedded motion estimation temporal recursive filter receives four input signals, i.e. the noisy video input signal 101, the equivalent additive noise variance 105, the noise type signal 110 and finally from the first part TRF, a frame delay version t signal 308 of the filtered output video f. Two main characteristics of the second part are the use of the criterion of minimum noise variance (MNV) and embedded motion estimation (EME) technique described in detail below for each pixel of the processed image.

It is worthwhile to mention that the proposed embedded motion estimation is complementary to classical motion estimation and compensation. Referring now to FIG. 4, classical motion estimation 413 and motion compensation 415 are now incorporated to the temporal recursive first order filter part 400. The classical motion estimation 413 receives the noisy video input signal 101 and the previous filtered image t signal 308 and provides motion vector signal 414. The skilled addressee will appreciate that a discussion of classical motion estimation techniques is not required here. The motion vector signal 414 is provided now to the motion compensation 415 to provide motion-compensated signal tc 416. Similar to the previous FIG. 3, the motion-compensated signal tc 416 is applied to a positive input of a subtraction operator 309 for and also to calculator 315. The former subtraction operator 309 provides embedded motion estimation recursive filter feedback signal $(t_c - \hat{m})$ 302. The calculator 315 performs proposed embedded motion estimation and temporal filter coefficient calculation.

Before the description of the embedded motion estimation and temporal filter coefficient calculator 315, it is interesting to introduce some theoretical background. In the following, the embedded motion estimation concept and minimum noise variance criterion is discussed.

Embedded Motion Estimation Concept g is the input noisy image with noise variance $\sigma_n^2$, f̂ the present filtered output image with noise variance $\sigma_{\hat{n}}^2$ and t is the past filtered image. Without classical motion estimation and compensation, the recursive filter feedback signal is the difference (t−m̂), where m̂ is a local estimated motion value which will be described later in more detail. With classical motion estimation and compensation, previous filtered image t will be simply substituted by its motion compensated version tc. However, for simplicity purpose, it should not be necessary to discuss further the case where there is the presence of classical motion estimation and compensation.

It is further assumed that the zero mean component of the input random noise in each frame is independent of the image signal. At each pixel (c,r), the motion and noisy images are defined as:

$$\begin{cases} m = f_{-1} - f \\ g = f + n \\ t = f_{-1} + \hat{n}_{-1} = f + m + \hat{n}_{-1} \\ \hat{f} = f + \hat{n} \end{cases} \quad (5)$$

In this expression, f and $f_{-1}$ represent the original and the past original frames respectively. The variable m is referred to as the motion value and is defined as the difference $(f_{-1}-f)$ between the two original image amplitudes. The parameters n and $\hat{n}_{-1}$ represent the noise in the present frame and the past filtered frame. Finally, n̂ is the residual output noise in the present filtered video frame. These above mentioned noises are zero mean.

For additive noise, there are reasons for using the additive motion value m:

If m̂ is an estimate of motion m, then the difference (t−m̂) can be interpreted as a motion compensated image. From the equation of the filtered signal output:

$$\hat{f} = b_0 \cdot g + (1-b_0) \cdot (t-\hat{m}), \quad (6)$$

The residual output noise may be shown as a function of noise and motion but free of image signals:

$$\hat{n} = b_0 \cdot n + (1-b_0) \cdot (\hat{n}_{-1} + m - \hat{m}) \quad (7)$$

Moreover, the definition of pixel-based motion value m in Equation (5) is different from the usual motion models which are not, in turn, always suitable for real life applications. The use of the proposed motion value definition of m is still plausible even when a scene change occurs. Finally, a similar multiplicative motion value definition which corresponds to the image ratio could be used for multiplicative noise.

Since the estimated motion value is required for the development of the noise reducer, the proposed technique is called "Embedded Motion Estimation" (EME). Unlike the costly temporal approach for a nonlinear filtering (see A. K. Katsaggelos, R. P. Kleihorst, S. N. Efstratiadis and R. L. Lagendijk, "Adaptive Image Sequence Noise Filtering Methods", SPIE Vol. 1606 Visual Communication and Image Processing 1991, pp 716-727), the motion information in the present document will be extracted mainly in the spatial domain.

Considering a sliding window surrounding the pixel of interest; with the model in equation (5), local value of m may be estimated through mean of the difference image (t−g) in the processed window. In order to get some precision for mean estimation, pixels of relative coordinates (i,j) in the window may be classified in two sets i.e. similar or not to the considered pixel of coordinates (c,r). This is basically the shape adaptive window technique which has already been presented in equation (2) of a previous module.

A possible local estimate m̂(c,r) of the motion value may then be obtained by the following weighted local mean:

$$\hat{m}(c,r) = E\{t(c,r) - g(c,r)\} \quad (8)$$

$$\hat{m}(c,r) = \frac{1}{N(c,r)} \sum_i \sum_j ((t(c,r) - g(c,r)) \cdot \omega_{ij}(c,r))$$

$$N(c,r) = \sum_i \sum_j \omega_{ij}(c,r)$$

where N(c,r) is the number of chosen pixels in the window around the pixel of interest at (c,r).

Moreover, in order to reduce low frequency residual noise artifacts in still parts of the image, the estimated motion value m̂ can be further refined as:

$$\hat{m}(c,r) = \begin{cases} \hat{m}(c,r), & \text{if } |\hat{m}(c,r)| \geq T2 \\ 0, & \text{otherwise} \end{cases} \quad (9)$$

Substituting the definitions of g and t in equation (5) and assuming that m is a constant value for the chosen pixels in the window, yields the following expressions:

$$\hat{m}(c,r) = \frac{1}{N(c,r)} \sum_i \sum_j (m(c,r) + \hat{n}_{-1}(c,r) - n(c,r))\omega_{ij}(c,r) \quad (10)$$

$$\hat{m}(c,r) = m(c,r) + \frac{1}{N(c,r)} \sum_i \sum_j (\hat{n}_{-1}(c,r) - n(c,r))\omega_{ij}(c,r) \quad (11)$$

Finally, from equation (11), it can be shown further that:

$$E\{\hat{m}(c,r)\} = m(c,r) \quad (12a)$$

and $$\text{var}(\hat{m}) = \frac{1}{N(c,r)} \sum_i \sum_j (\text{var}(\hat{n}_{-1}) + \text{var}(n))\omega_{ij}(c,r) \leq 2\sigma_n^2 \quad (12b)$$

In other words, the estimated value m̂ in equation (10) is unbiased with finite variance. Thus, it can be used for motion compensation in a temporal filter at each pixel of coordinates (c,r):

$$t - \hat{m} = f_{-1} + \hat{n}_{-1} - \hat{m} = f + m + \hat{n}_{-1} - \hat{m} \approx f - \hat{n}_{-1} \quad (13)$$

Temporal Recursive Filter and Minimum Residual Noise Variance Criterion:

The residual noise at the temporal filter output is given by equation (7). At the considered pixel of coordinates (c,r), an equivalent noise n1 is defined and is composed of past filtered noise and of an unbiased estimate of motion value:

$$n_1 = \hat{n}_{-1} + m - \hat{m} \quad (14)$$

From the equations (7) and (14), the variance of residual filtered noise output may be calculated by the following equation:

$$\sigma_{\hat{n}}^2 = b_0^2 \cdot \sigma_n^2 + (1-b_0)^2 \sigma_{n_1}^2 + 2b_0(1-b_0)\text{cov}_{n,n_1} \quad (15)$$

In order to optimize the performance, minimum noise variance criterion is used in the present filter. It can be shown that the filter coefficient b0 may be determined as:

$$b_0 = \max\left(\frac{\sigma_{n_1} - cov_{n,n_1}}{\sigma_n^2 + \sigma_{n_1}^2 2cov_{n,n_1}}, \varepsilon\right) \quad (16)$$

where $\varepsilon$ is a small offset value such as $1/8$ or $1/16$ in order to overcome eventual excessive precision. There are two remaining unknown values to be determined in this equation i.e. the equivalent noise variance $\sigma_{n_1}^2$ and the covariance $cov_{n,n_1}$.

From the definition of $cov_{n,n_1} = E\{n \cdot n_1\} - E\{n\} \cdot E\{n_1\}$ and the following expression of the equivalent noise $n_1$:

$$n_1 = m + \hat{n}_{-1} - \hat{m} = \hat{n}_{-1} + \frac{1}{N} \cdot \sum_i \sum_j (n(i,j) - \hat{n}(i,j)) \cdot \omega_{ij} \quad (17)$$

it can be shown that:

$$cov_{n,n_1} = \sigma_n^2 / N \quad (18)$$

The variance $\sigma_{n_1}^2$ of equivalent noise will be calculated with the following term h defined as:

$$h = n - n_1 = g - t + \hat{m} = (n - m) - (\hat{n}_{-1} - \hat{m}) \quad (19)$$

The term h is a random process of zero mean. With further calculations, one obtains:

$$\sigma_h^2 = \left[\left(1 - \frac{2}{N}\right)\sigma_n^2 + \sigma_{n_1}^2\right] \quad (20)$$

or $$\sigma_{n_1}^2 = \sigma_h^2 - \left(1 - \frac{2}{N}\right)\sigma_n^2$$

The local $\sigma_h^2$ may be estimated directly from $(t-g-\hat{m})$ with the previously determined shape adaptive window surrounding the considered pixel at (r,c):

$$\sigma_h^2 = \frac{1}{N} \sum_i \sum_j (t_{ij} - g_{ij} - \hat{m}_{ij})^2 \omega_{ij} \quad (21)$$

The filter coefficient b0 given in equation (16) becomes:

$$b_0 = \max\left(\frac{\sigma_h^2 - \sigma_n^2\left(1 - \left(\frac{1}{N}\right)\right)}{\sigma_h^2}, \varepsilon\right) \quad (22)$$

In the proposed implementation, the term (1/N) is omitted, i.e. $cov_{n,n_1} = 0$, $\sigma_h^2$ is weighted by a factor C equals to 0.75 for Y and 1 for Cr and Cb components and $\varepsilon$ is set to be (1/8):

$$b_0 = \max\left(\frac{C\sigma_h^2 - \sigma_n^2}{C\sigma_h^2}, \frac{1}{8}\right) \quad (23)$$

Moreover when $C\sigma_h^2 < \sigma_n^2$, in order to reduce excessive filtering, the filter coefficient b0 is set equal to an empirical value $15/64$:

$$b_0 = \begin{cases} \max\left(\frac{C\sigma_h^2 - \sigma_n^2}{C\sigma_h^2}, \frac{1}{8}\right), & \text{if } C\sigma_h^2 > \sigma_n^2 \\ 15/64, & \text{else.} \end{cases} \quad (24)$$

The residual output noise variance required for further spatial filtering is equal to $$\sigma_{\tilde{n}}^2 = G \cdot \sigma_n^2 \cdot b_0. \quad (25)$$

in which the empirical factor G is equal to:

$$G = \begin{cases} 1, & \text{for Additive (N1) or Multiplicative (N2) Noise} \\ \frac{1}{2}, & \text{else.} \end{cases} \quad (26)$$

It is worthwhile to mention that minimum noise variance is always possible when local input noise power is known. In another word, the minimum noise variance is not restricted to fixed or varying local input noise power.

Referring now to FIG. 4, there is illustrated an embedded motion estimation and temporal recursive filter coefficient calculator. FIG. 4 represents hardware or software implementation of the above theoretical section.

The embedded motion estimation and temporal recursive filter coefficient calculator 351 receives four signals i.e. the noisy video input signal g 101, the noise variance signal 105, the noise type signal 110 and depending on the case, the previous filtered signal t 308 or the classical motion compensated previous signal tc 416.

Figure 5:
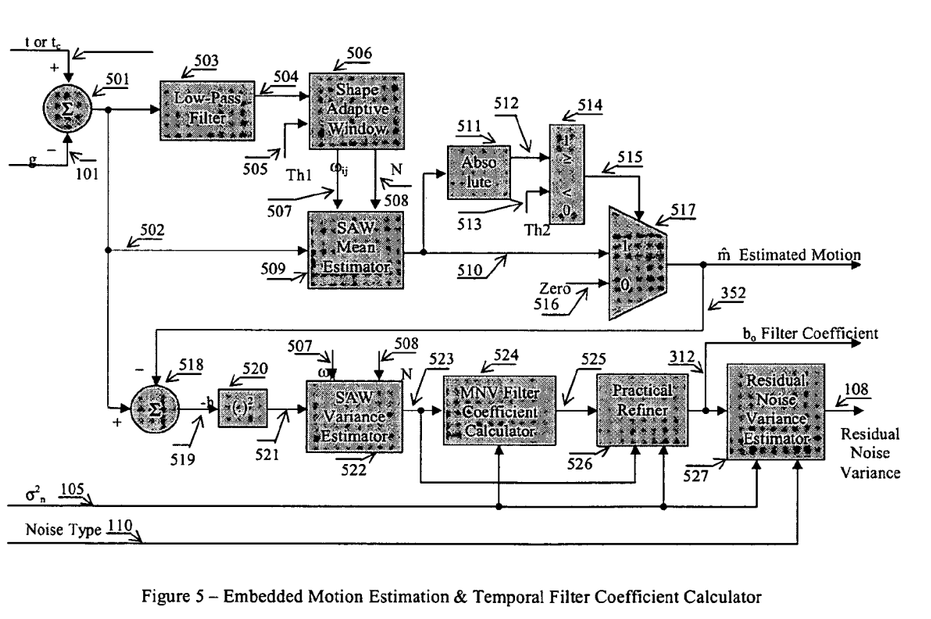
FIG. 5 is a block diagram of an embodiment of an embedded motion estimation temporal filter coefficient calculator.

The previous filtered signal t 308 and the noisy video input signal g 101 are applied together to the subtraction operator 501 (as shown in FIG. 5) to form the difference (t−g) 502 required for estimated motion $\hat{m}$. The difference signal 502 is provided to the low pass filter 503, to the shape adaptive window mean estimator 509 and to the positive input of subtraction operator 518.

The low pass filter 503, part of shape adaptive window technique, is used for robustness against noise. Its proposed impulse response is given again as follows:

$$lp503(c,r) = \begin{bmatrix} 7 & 7 & 7 \\ 7 & 8 & 7 \\ 7 & 7 & 7 \end{bmatrix} / 64.$$

Low pass filter output 504 is provided to shape adaptive window 506 which provides in turn local binary classification results $\omega_{ij}(c,r)$ 507 and their corresponding total number N(c, r) 508. In the embodiment disclosed, the window size is 5 lines by 11 columns. These two signals already described by Equations (2) and (3) are provided to the shape adaptive window mean estimator 509 and to shape adaptive window variance estimator 522.

The shape adaptive window mean estimator 509 receives also the difference signal (t−g) 502 and provides an estimated motion value signal 510 in accordance with Equation (8). Absolute value operator 511, comparator 514 and multiplexer 517 follow the shape adaptive window mean estimator 509 as shown in FIG. 5. The multiplexer 517 provides estimated motion $\hat{m}$ in accordance with Equation (9). The Multiplexer output 352 corresponds to the final estimated motion with reduced low frequency residual noise artifacts. Estimated motion signal $\hat{m}$ 352 is applied in turn to negative input of adders 309 and 518. The adder 309 in FIG. 3 or FIG. 4 provides the feedback difference signal $(t-\hat{m})$ or $(t_c-\hat{m})$ 302 for temporal recursive filter. In accordance with Equation (19), the adder 518, shown in FIG. 5, generates signal $(-h)$ 519 from which the variance is required for filter coefficient calculation.

The variance of the signal h, $\sigma^2_h$, is also computer by shape adaptive window technique. The signal $(-h)$ 519 is then applied first to squaring device 520 from which the output 521 and shape adaptive window parameters signals 507 and 508 are applied in turn to shape adaptive window variance calculator 522. For practical purposes, the shape adaptive window variance calculator 522 implements a modified version of Equation (21) and provides $C\sigma^2_h$ at its output 523 in which C is an empirical factor function of video components. Precisely, the output 523 is given by the following equation:

$$C\sigma^2_h = \frac{K}{N} \sum_i \sum_j (t_{ij} - g_{ij} - \hat{m}_{ij})^2 \omega_{ij}, \quad \begin{array}{l} C = 0.75 \text{ for } Y \\ C = 1 \text{ for } Cr, Cb \end{array} \quad (21b)$$

As described previously, the output 523 required for minimizing output noise variance, is provided to MNV Filter Coefficient Calculator 524 together with the input noise power $\sigma^2_n$ 105. The MNV filter coefficient calculator 524 determines a filter coefficient value $b_0$ in accordance to Equation (23). The determined $b_0$ signal 525 is then provided to practical refiner 526.

The practical refiner 526 receives the determined $b_0$ signal 525, the variance signal $C\sigma^2_h$ 523 and the input noise power $\sigma^2_n$ 105 and modify the filter coefficient value $b_0$ for some specific condition given in Equation (24) to provide final coefficient value signal $b_0$ 312. It will be appreciated that the final coefficient value signal $b_0$ 312 is the final coefficient for the temporal recursive first order filter 300 shown in FIG. 3 or 400 shown in FIG. 4.

The final coefficient value signal $b_0$ 312, the input noise variance $\sigma^2_n$ 105 and the noise type signal 110 are provided to residual noise variance estimator 527 to provide an estimated power 108 of residual noise in temporally filtered video output $\hat{f}$ 107 in accordance to Equations (25) and (26).

The temporally filtered video $\hat{f}$ 107 and its associated residual noise power signal 108 are then provided to the spatial noise reducer 109 as shown in FIG. 1.

Finally it is worthwhile to mention that the proposed embedded motion estimation and minimization of residual noise reducer works for non recursive structure. However, it has been contemplated that the recursive noise reducer provides better results.

Figure 6:
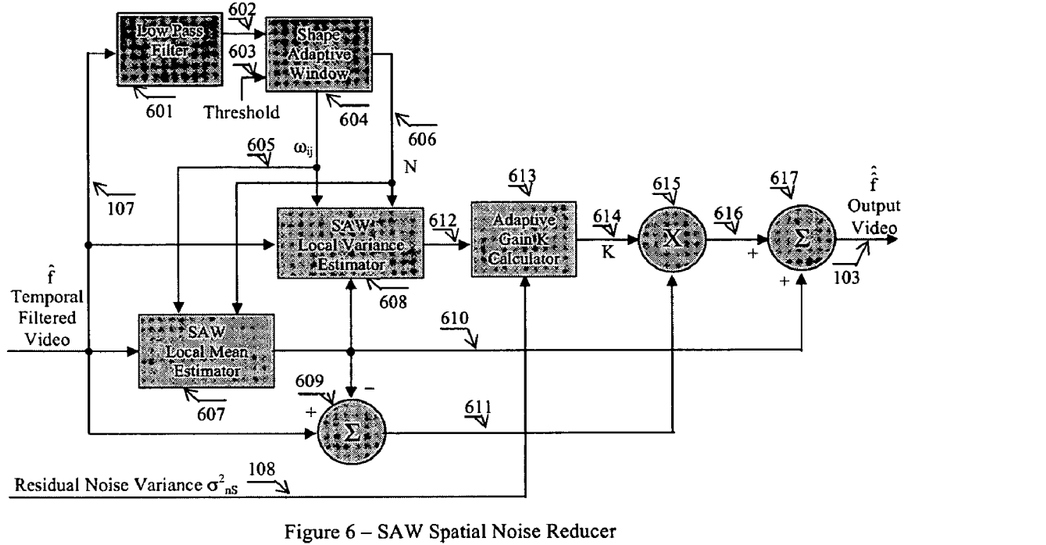
FIG. 6 is a block diagram of an embodiment of a shape adaptive windowing spatial noise reducer.

Now referring to FIG. 6, there is shown an embodiment of the shape adaptive windowing spatial noise reducer (SAW-SNR).

The shape adaptive windowing spatial noise reducer (SAW-SNR) has been disclosed in U.S. Pat. No. 6,633,683. However, introduced banding artifact effect in slowly varying regions and generic minimum mean square error structure for some usual types of noise are not considered.

The spatial noise reducer module is a modified version of Lee's original Minimum Mean Squared Error (MMSE) reduction (J. S. Lee, "Digital Image Enhancement and Noise filtering", IEEE Trans. on Pattern Analysis and Machine Intelligence, Vol. Pami-2, No. 2, March 1980) which can be stated as follows:

Let us define an original image $f(c,r)$, a noisy image $g(c,r)$ as input, $g(c,r)=f(c,r)+n(c,r)$ and finally $y(c,r)$ will be the filtered version. If the two first order local statistics, i.e. the mean $m(c,r)$ and the variance $\sigma^2_g(c,r)$, of the image are known, then for additive zero mean and known variance $\sigma^2_n(c,r)$ noise, the filtered signal output is given by:

$$y(c,r)=m(c,r)+K(c,r)[g(c,r)-m(c,r)] \quad (27)$$

where $$K(c,r)=\max[0, (\sigma^2_g(c,r)-\sigma^2_n(c,r))/\sigma^2_g(c,r)]. \quad (28)$$

Meanwhile, the error performance is written as:

$$E\{[f(c,r)-y(c,r)]^2\} = \begin{cases} \sigma^2_f(c,r), & \text{if } \sigma^2_g(c,r) < \sigma^2_n(c,r) \quad (29) \\ \sigma^2_f(c,r) \cdot \sigma^2_n(c,r) / [\sigma^2_f(c,r) + \sigma^2_n(c,r)] & (30) \end{cases}$$

For a single linear estimator, Lee's algorithm is perfect when $m(c,r)$, $\sigma^2_g(c,r)$ are known and when $\sigma^2_g(c,r) > \sigma^2_n(c,r)$. However, for practical situations, the two first order local statistics $m(c,r)$ and $\sigma^2_g(c,r)$ are unknown and need to be estimated. On the other hand, when $\sigma^2_g(c,r) < \sigma^2_n r(c,r)$, using $K(c,r)=0$, the small details contained in the original image will be destroyed as shown by Equation (29).

In the following descriptions of SNR, the modifications proposed comprise three major techniques shape adaptive windowing (SAW) for local mean and variance estimation, banding effect reduction (BER) for small signal variance case and noise power converter incorporation for generic noise reducer structure.

The spatial noise reducer 109, as illustrated in FIG. 1, receives the temporally filtered video signal 107 of three components (Y, Cr, Cb) and their corresponding estimated residual noise powers 108 provided by the temporal recursive noise reducer 106.

In FIG. 6, the video signal 107 is provided to four units or devices i.e. low pass filter 601, shape adaptive windowing mean estimator 607, shape adaptive windowing variance estimator 608 and positive input of subtraction operator 609.

The low pass filter 601, part of shape adaptive windowing technique, is given by the following impulse response:

$$lp601(c,r) = \begin{bmatrix} 7 & 7 & 7 \\ 7 & 8 & 7 \\ 7 & 7 & 7 \end{bmatrix} / 64.$$

The output of the low pass filter 601 is provided to the shape adaptive window 604 which provides in turn local binary classification results $\omega_{ij}(c,r)$ 605 and their corresponding total number $N(c,r)$ 606.

In the embodiment disclosed, the window size is 5×5. These two signals are provided to the shape adaptive windowing mean estimator 607 and to the shape adaptive windowing variance estimator 608 to provide respectively the following output signals 610 and 612:

$$m(c,r) = (1/N(c,r)) \sum_i \sum_j \hat{f}_{ij}(c,r) \omega_{ij}(c,r) \quad (31)$$

-continued $$\sigma_{\hat{f}}^2(c, r) = (1/N(c, r)) \sum_i \sum_j (\hat{f}_{ij}(c, r) - m(c, r))^2 \omega_{ij}(c, r) \quad (32)$$

Figure 7:
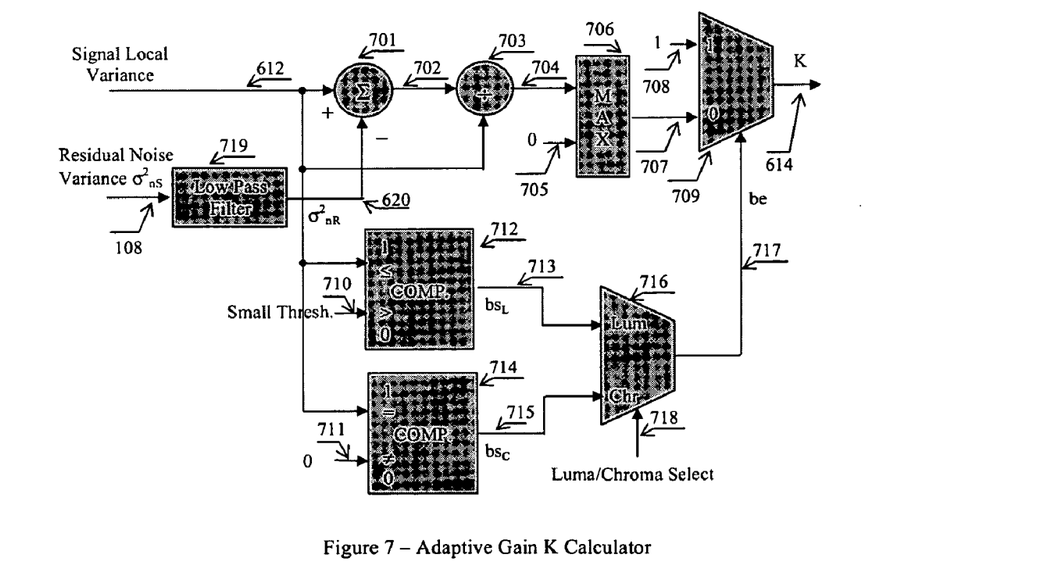
FIG. 7 is a block diagram of an embodiment of an adaptive gain K calculator.

The former m(c,r) 610 is provided to negative input of adder 609 and also to adder 617. The latter 612 is provided to the input of adaptive gain calculator 613. If K(c,r) 614 denotes the adaptive gain output signal of 613, then it can see that f(c,r) final filtered video output 103 is realized as the following expression:

$$f(c,r) = m(c,r) + K(c,r) \cdot (\hat{f}(c,r) - m(c,r)) \quad (33)$$

in accordance with the minimum mean square error filter's structure of Equation (27). The adaptive gain K(c,r) will be described in detail in FIG. 7.

Referring to FIG. 7, there is shown an embodiment of an adaptive gain calculator.

The adaptive gain calculator receives the local variance 612 of the input image 107 and the residual noise variance $\sigma_{nS}^2$ 108 in the image input.

The residual noise variance $\sigma_{nS}^2$ 108 is low passed filtered by 719 to provide a smoothed version $\sigma_{nR}^2$ 620. This signal is combined together with local signal variance $\sigma_{\hat{f}}^2$ 612 via subtraction operator 701, divider 703 and max selector 706 to forms a gain signal K1 707 mathematically given by:

$$K_1(c, r) = \max\left(0, \frac{\sigma_{\hat{f}}^2(c, r) - \sigma_{nR}^2(c, r)}{\sigma_{\hat{f}}^2(c, r)}\right) \quad (34)$$

Equation (34) is the standard form, i.e. Equation (28), of minimum mean square error filtering technique.

At the same times, local signal variance $\sigma_{\hat{f}}^2$ 612 is applied to comparator 712 and to comparator 714.

The comparator 712, for luminance case, gives a binary signal bsL(c,r) output 713 in accordance to $$bs_L(c, r) = \begin{cases} 1, & \text{if } \sigma_{\hat{f}}^2(c, r) \leq \text{Small Threshold} \\ 0, & \text{if } \sigma_{\hat{f}}^2(c, r) > \text{Small Threshold} \end{cases} \quad (36)$$

in which small threshold value 710 is chosen equal to 1.25 in an 8-bit resolution.

For the chrominance case, small threshold value 711 is more restrictive. The comparator 714 provides a binary signal output bsC(c,r) 715 with the following test:

$$bs_C(c, r) = \begin{cases} 1, & \text{if } \sigma_{\hat{f}}^2(c, r) = 0 \\ 0, & \text{if } \sigma_{\hat{f}}^2(c, r) \neq 0 \end{cases} \quad (35)$$

One of the above binary signals will be selected by selector 716. The selector output 117, denoted as be(c,r), is used, in turn, to control selector 709 which finally provides the adaptive gain K(c,r) 614:

$$K(c, r) = \quad (36)$$

-continued
$$\begin{cases} 1, & \text{if } be(c, r) = 1, \text{ i.e. signal variance very small} \\ K_1(c, r), & \text{if else} \end{cases}$$

It will therefore be appreciated that in other words, when noisy signal variance is very small, it is not necessary to apply the filter on the signal.

The local adaptive gain K(c,r) signal 614 is provided to multiplier 615 for completing the minimum mean square error filtering.

Figure 8:
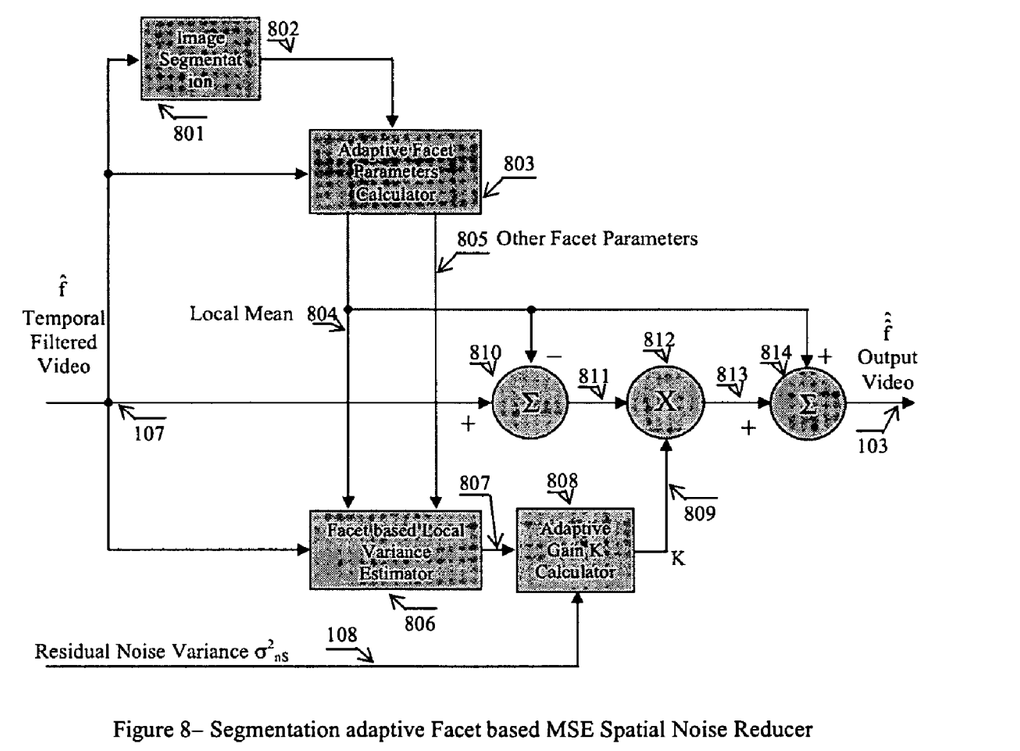
FIG. 8 is a block diagram of an embodiment of a region adaptive facet based spatial noise reducer.

Referring to FIG. 8, there is shown an embodiment of a region adaptive facet based spatial noise reducer (RAFB-SNR).

As previously mentioned, in order to exploit the MMSE criterion in spatial filtering, it is necessary to know the local signal mean and variance values with some precision. The proposed SAW for mean and variance estimation cannot be necessarily precise when the original signal is not constant but slowly varying and locally represented as a sloped facet (piecewise linear model) or a piecewise quadratic model. In order to select linear versus quadratic model, a simple image segmentation is required. The piecewise linear model is applied for flat regions, piecewise quadratic otherwise. Image segmentation is thus useful for an adaptation of facet model order determination.

The estimated mean value is used for de-noising signal value. In the following, a region adaptive facet based spatial noise reducer (RAFB-SNR) is proposed. The spatial noise reducer comprises two different innovations: a)—MMSE de-noising technique, b)—Facet models (piecewise linear or piecewise quadratic) adaptation depending on segmented regions.

RAFB-SNR 111 as illustrated in FIG. 8 receives residual noisy three component (Y, Cr, Cb) video 107 provided from TF 106 and theirs corresponding estimated noise powers 108.

The received video 107 is applied to Adaptive Facet Parameters Calculator 803, Adder 810, Facet based Local Variance Estimator 806 and Image Segmentation module 801.

Image Segmentation module 801 provides a binary signal output 802 Flat/No-Flat regions. For skill people in the art, Flat/No-Flat segmentation can be provided by a plurality of possible processing techniques. Flat/No-Flat regions signal 802 is sent to Adaptive Facet Parameters Calculator 803.

Facet Parameters utilized in the invention are the coefficients $b_0(c,r), b_1(c, r), \ldots, b_5(c,r)$ which approximate in the least squared fit an incoming signal y(i,j; c,r) in a window centered at the coordinates (c,r):

$$b_k(c, r) = \text{argmin} \sum_i \sum_j \{y(i, j; c, r) - [b_0(c, r) + b_1(c, r)i + b_2(c, r)j + b_3(c, r)i^2 + b_4(c, r)ij + b_5(c, r)j^2]\}^2.$$

This expression is utilized when the central pixel is classified to belong to a No-Flat region. For an estimated Flat region signal, the coefficients $b_3$, $b_4$ and $b_5$ are set to be equal to zero.

The coefficient $b_0(c,r)$ corresponds furthermore to the local signal mean signal 1004:

$$\text{mean}(c,r) = b_0(c,r).$$

The six (6) coefficients $b_k(c,r)$ 804 and 805 are send to Facet based Local variance estimator 1006 which provides in turn variance signal 807 by the following expression:

$$\mathrm{var}(c, r) = \sum_i \sum_j \{y(i, j; c, r) - [b_0(c, r) + b_1(c, r)i + b_2(c, r)j + b_3(c, r)i^2 + b_4(c, r)ij + b_5(c, r)j^2]\}^2.$$

Local variance signal 807 and Residual noise power $\sigma^2_{nS}$ 108 are used together by Adaptive Gain Calculator 808 which yields in turn a gain signal K 809. Adaptive Gain K Calculator according to MMSE criterion is as previously described.

Adder 810, Multiplier 812 and Adder 814 are utilized to form MMSE de-noising signal output 103.

Figure 9:
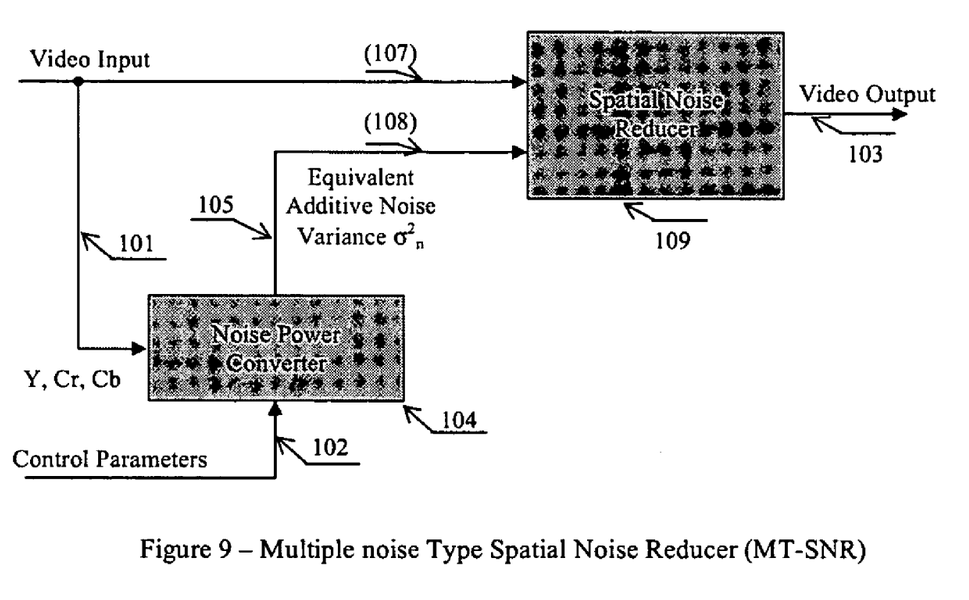
FIG. 9 is a block diagram of another embodiment of a multiple noise type spatial noise reduction (MT-SNR) apparatus.

Referring now to FIG. 9, there is illustrated a second embodiment of a multiple noise type spatial noise reduction (MT-SNR) apparatus.

For economical purpose or for the case of single image, the temporal filter may be removed. Only a generic spatial noise reducer is thus required in such applications. The multiple noise type spatial noise reduction (MT-SNR) in FIG. 9 is proposed for the given five types of noise.

The multiple noise type spatial noise reduction (MT-SNR) comprises two main blocks i.e. a noise power converter 104 and a spatial noise reducer (SNR) 109. Noise power converter 104 already described remains unchanged. The SNR 109, realized with either SAW-SNR or RAFB-SNR, is also unchanged except its inputs (107) and (108) accept now 101 video input and 105 estimated equivalent additive noise power signals respectively.

As an example, let us consider the multiplicative noise N2 case in which proposed equivalent additive noise power is $\sigma^2_n = \mu^2 \cdot \sigma^2_u$. Substituting the result into the fundamental part, basic for minimum mean square error, of Equation 28 yields:

$$K(c, r) = \frac{\sigma^2_g(c, r) - \sigma^2_n}{\sigma^2_g(c, r)}$$
$$= \frac{\sigma^2_g(c, r) - \mu^2 \sigma^2_u}{\sigma^2_g(c, r)}.$$

Since $\sigma^2_u$ is generally very small to compare with 1, the result is comparable with a direct linear minimum mean square error optimization one:

$$K(c, r) = \frac{\sigma^2_g(c, r) - \mu^2 \sigma^2_u}{\sigma^2_g(c, r)(1 + \sigma^2_u)}.$$

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal.

The embodiment(s) of the invention described above is(are) intended to be exemplary only. The scope of the invention is therefore intended to be limited solely by the scope of the appended claims.

We claim:

1. An apparatus for reducing multiple noise types in a video input signal, said apparatus comprising:

a noise power converter for receiving and using said video input signal, a variance of additive noise, a variance of multiplicative noise and an indication of a type of noise for estimating an equivalent additive noise variance signal;

a temporal recursive filter using said equivalent additive noise variance and said video input signal for generating a temporally filtered video signal and a residual noise variance signal;

a spatial noise reducer using said residual noise variance signal and said temporally filtered video signal for spatially filtering said video input signal to provide a video output signal having reduced noise; and wherein said noise power converter comprises a low pass filter for filtering said video input signal to provide a low pass filtered signal;

a shape adaptive window for receiving and using said low pass filtered signal, and a given threshold tolerance for calculating a binary signal $\omega_{ij}(c,r)$ representing local classification results within said threshold tolerance and a signal N(c,r) indicative of similar pixels in said window;

a shape adaptive window mean estimator using said binary signal $\omega_{ij}(c,r)$, said N(c,r) signal and said video input signal for calculating a local estimated means signal value $\mu Y(c,r)$ given by $$\mu_Y(c, r) = (1/N(c, r)) \sum_i \sum_j Y_{ij}(c, r) \omega_{ij}(c, r);$$

and an equivalent additive noise variance calculator using said local estimated means signal value $\mu Y(c,r)$, said variance of additive noise, said variance of multiplicative noise and said indication of a type of noise for calculating said equivalent additive noise variance signal.

2. The apparatus as claimed in claim 1, wherein said multiple noise types comprise additive (N1), multiplicative with negative gamma γ photographic density (N2), multiplicative with positive gamma γ photographic density (N3), speckle with negative gamma γ photographic density (N4) and speckle with positive gamma γ photographic density (N5).

3. The apparatus as claimed in claim 1, wherein said low pass filter has an input response as follows:

$$lp20I(c, r) = \begin{bmatrix} 7 & 7 & 7 \\ 7 & 8 & 7 \\ 7 & 7 & 7 \end{bmatrix} \Big/ 64.$$

4. The apparatus as claimed in claim 1, wherein said binary signal $\omega_{ij}(c,r)$ is given by:

$$\omega_{ij}(c, r) = \begin{cases} 1, & \text{if } |lp(Y_{ij}(c, r)) - lp(Y_{00}(c, r))| < \text{Threshold} \\ 0, & \text{else} \end{cases}$$

where lp(Y(c,r)) comprises said low pass filtered signal for luminance component Y at (c,r).

5. The apparatus as claimed in claim 1, wherein signal N(c,r) indicative of similar pixels in said window is given by:

$$N(c,r) = \Sigma\Sigma \omega ij(c,r).$$

6. The apparatus as claimed in claim 1, wherein said temporal recursive filter comprises:
- an embedded motion estimation and temporal filter coefficient calculation unit for receiving and using said video input signal, said equivalent additive noise variance and a past temporally filtered video signal t for calculating said residual noise variance signal, an estimated motion signal m̂ and a filter coefficient b0; and
- a temporal recursive first order filter for filtering using said video input signal, said filter coefficient b0 and said estimated motion signal m̂ to provide said temporally filtered video signal.

7. The apparatus as claimed in claim 6, wherein said temporally filtered video signal f̂ is given by:

$$f̂ = (g - (t - m̂)) \cdot b0 + (t - m̂).$$

8. A method for reducing multiple noise types in a video input signal, said method comprising:
- estimating an equivalent additive noise variance signal using said video input signal, a variance of additive noise, a variance of multiplicative noise and an indication of a type of noise;
- temporally filtering said video input signal video signal
- generating a residual noise variance signal using said equivalent additive noise variance and said video input signal;
- spatially filtering said temporally filtered video signal using said residual noise variance signal and said video input signal to provide a video output signal having reduced noise; and
- wherein said estimating of an equivalent additive noise variance signal comprises low-pass filtering said video input signal to provide a low-pass filtered signal; calculating a binary signal ωij(c,r) representing local classification results within said threshold tolerance and a signal N(c,r) indicative of similar pixels in said window using said low pass filtered signal, and a given threshold tolerance; calculating a local estimated means signal value μY(c,r) using said binary signal ωij(c,r), said N(c,r) signal and said video input signal calculating a local estimated means signal value μY(c,r) using $$\mu_Y(c, r) = (1/N(c, r)) \sum_i \sum_j Y_{ij}(c, r) \omega_{ij}(c, r)$$

and calculating said equivalent additive noise variance signal using said local estimated means signal value μY(c,r), said variance of additive noise, said variance of multiplicative noise and said indication of a type of noise.

9. The method as claimed in claim 8, wherein said multiple noise types comprise additive (N1), multiplicative with negative gamma γ photographic density (N2), multiplicative with positive gamma γ photographic density (N3), speckle with negative gamma γ photographic density (N4) and speckle with positive gamma γ photographic density (N5).

10. The method as claimed in claim 8, wherein said low pass filtering has an input response as follows:

$$lp201(c, r) = \begin{bmatrix} 7 & 7 & 7 \\ 7 & 8 & 7 \\ 7 & 7 & 7 \end{bmatrix} \Big/ 64.$$

11. The method as claimed in claim 8, wherein said binary signal ωij(c,r) is given by:

$$\begin{cases} 1, & \text{if } |lp(Y_{ij}(c, r)) - lp(Y00(c, r))| < \text{Threshold} \\ \omega ij(c, r) = 0, & \text{else} \end{cases}$$

where lp(Y(c,r)) comprises said low pass filtered signal for luminance component Y at (c,r).

12. The method as claimed in claim 8, wherein said signal N(c,r) indicative of similar pixels in said window is given by:

$$N(c,r) = \Sigma\Sigma \omega ij(c,r).$$

13. The method as claimed in claim 8, wherein said generating a residual noise variance signal comprises using said video input signal, said equivalent additive noise variance and a past temporally filtered video signal t for calculating said residual noise variance signal, an estimated motion signal m̂ and a filter coefficient b0; and further wherein said temporally filtering said video input signal comprises using said filter coefficient b0 and said estimated motion signal m̂ to provide said temporally filtered video signal.

14. The method as claimed in claim 13, wherein said temporally filtered video signal f̂ is given by:

$$f̂ = (g - (t - m̂)) \cdot b0 + (t - m̂).$$

* * * * *